Dec. 2, 1924.

C. H. RANKIN

TOOTHED GEARING

Filed Dec. 18, 1923

1,518,109

INVENTOR
Carl Henry Rankin
By
Attorney

Patented Dec. 2, 1924.

1,518,109

UNITED STATES PATENT OFFICE.

CARL HENRY RANKIN, OF WELLSBURG, WEST VIRGINIA.

TOOTHED GEARING.

Application filed December 18, 1923. Serial No. 681,415.

*To all whom it may concern:*

Be it known that I, CARL HENRY RANKIN, a citizen of the United States of America, residing at Wellsburg, in the county of Brooke and State of West Virginia, United States, have invented new and useful Improvements in Toothed Gearing, of which the following is a specification.

This invention relates to improvements in toothed gearing for connecting two or more shafts rotating in synchronism and which are required to be adjustable rotationally one with respect to another so that the phases of rotation of each shaft with respect to the other, or others, can be varied when required. Such gearing can be advantageously employed in machines comprising a number of parts performing in a given order a number of different functions which are co-operative for a given purpose. By way of example, the invention can be applied to means for controlling the flow of molten glass from a delivery aperture so as to form the glass into gobs or gathers of uniform size and shape, the several shafts being respectively arranged to operate the valves of compressed air cylinders for actuating the metal expelling plunger and cutoff slide provided in such flow controlling means, to operate a valve or valves whereby the air pressure within a hollow plunger comprised in the said flow controlling means can be varied, and to operate other parts of the flow controlling means, as required. Or, for example, the invention may be applied to machinery in which a piece of material or stock undergoes a series of cutting, boring or like operations by instruments each of which is separately actuated by an appropriate shaft or spindle at times which are suitably correlated to the times of actuation of the other instruments.

According to this invention each shaft is geared to the adjacent shaft or shafts by gearing comprising coaxial wheels one of which is keyed to the first mentioned shaft and the other is loose on the same shaft and in gear directly or indirectly with a wheel keyed on an adjacent shaft the rotation of which is to be timed with respect to the first mentioned shaft, the coaxial wheels being geared together by a pinion carried on a frame rotatably mounted coaxially to the first mentioned shaft and provided with means for adjusting its position angularly and for holding it stationary in the position to which it is thus adjusted.

Figure 1:
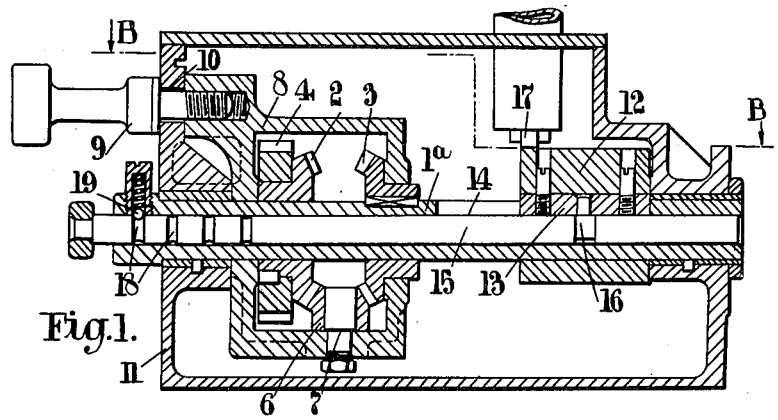
Figure 1 shows a section on the line A—A, Figure 2.
Figure 2:
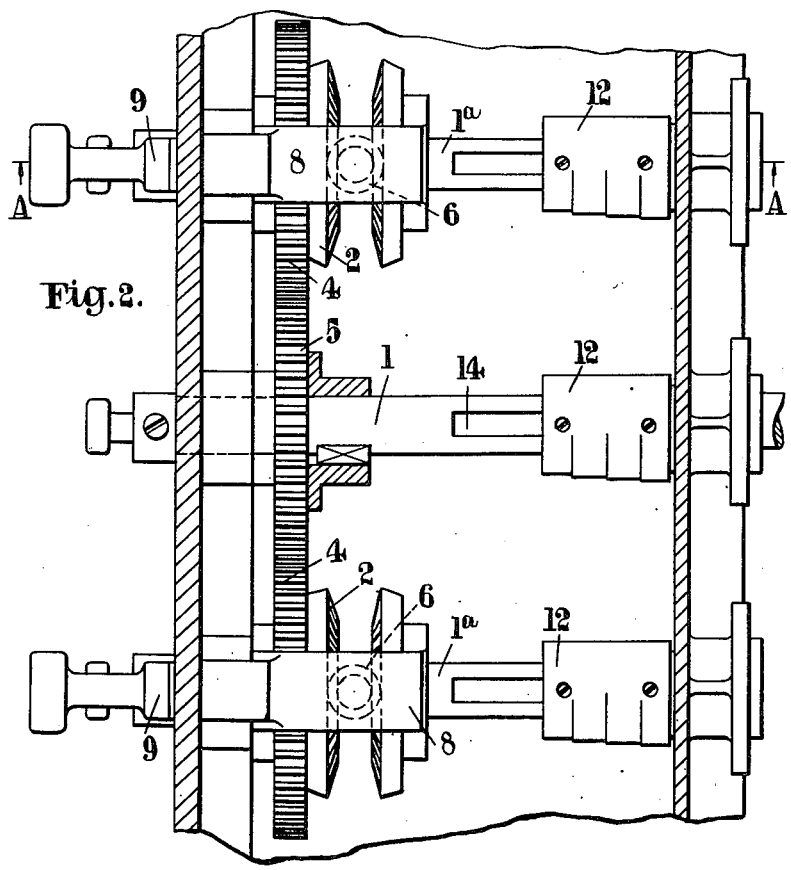
Figure 2 shows a plan in section on the line B—B, Figure 1 of a series of shafts connected by gearing arranged in accordance with this invention.

As shown 1 is a driving shaft and 1ª, 1ª are driven shafts on each of which toothed gearing is mounted comprising, as shown in Figure 1, a bevel wheel 2 loose on the shaft 1ª, a bevel wheel 3 keyed on the shaft 1ª and a spur wheel 4 carried on the loose bevel wheel 2. The bevel wheels 2, 3 are geared together by a bevel pinion 6 rotatably mounted on a trunnion 7 carried by a frame 8 which can be rocked on the shaft 1ª and held in the position to which it is moved by a clamping screw 9 screwing into the frame 8 and movable in a slot 10 in a fixed casing 11. Any other convenient means may be provided for adjusting the position of the frame 8 and holding it in its adjusted position, for example, worm teeth may be cut in the periphery of the frame so that it can be rotated or held stationary by a worm gearing with the said teeth.

The spur wheels 4 are arranged in gear with a spur wheel 5 on the driving shaft, either directly, as shown, or through idle pinions.

With this arrangement either shaft can be adjusted angularly with reference to the remaining shafts by rocking the corresponding frame 8, the bevel wheel 2 then serving as a fulcrum for the bevel pinion 6 so that a rotational adjusting movement is transmitted to the bevel wheel 3. This adjustment can be effected when the shafts 1, 1ª are rotating as well as when they are at rest. When the frames 8 are held stationary the shaft 1, 1ª rotate in synchronism, motion being transmitted to either shaft 1ª through the corresponding spur wheel 4, bevel wheel 2, bevel pinion 6 on the stationary trunnion 7, and bevel wheel 3.

The improved gearing can be conveniently applied to cam shafts having multiple faced cams slidably mounted thereon. In this case the cam 12 is fixed to a driving key 13 movable in a slot 14 in the shaft 1, or 1ª; the latter is made hollow so that a rod 15 can be passed through it and attached to the key by a pin 16. The shaft, the key 13, cam 12 and rod 15 then rotate together but the cam 12 can be moved longitudinally on the shaft to vary its position with respect to a part 17 operated by the cam. The rod 15 may have grooves 18 cut therein into which a spring latch 19 carried by the shaft can project, to retain the cam in predetermined positions.

I claim:—

1. Gearing for transmitting synchronized movement comprising multiple faced cams, shafts on which the said cams are mounted, means for adjusting the position of each cam axially on its shaft, gearing rotationally connecting the said shafts and means for altering the phase of each shaft with respect to the other shafts.

2. Gearing for transmitting synchronized movement comprising multiple faced cams, hollow shafts on which the said cams are mounted, keys rigidly connected to the cams and slidable in slots in the shafts, rods connected to the keys and movable within the shafts to adjust the positions of the cams axially on the shafts, gearing rotationally connecting the said shafts and means for altering the phase of each shaft with respect to the other shafts.

3. Gearing for transmitting synchronized movement comprising multiple faced cams, hollow shafts on which the said cams are mounted, keys rigidly connected to the cams and slidable in slots in the shafts, rods connected to the keys and movable within the shafts to adjust the positions of the cams axially on the shafts, means for holding the said rods in predetermined positions of adjustment, gearing rotationally connecting the said shafts, and means for altering the phase of each shaft with respect to the other shafts.

4. Mechanism comprising cam operated members, multiple faced cams slidable axially on the said shafts into alternative operative positions relatively to the said members, gearing connecting the said shafts and means for adjusting the phase of each shaft relatively to the other shafts.

5. Gearing for transmitting synchronized movement, comprising multiple faced cams, hollow shafts on which the said cams are mounted, said shafts having slots, keys rigidly connected to the cams and slidable in the slots of said shafts, rods connected to the keys and movable within the shafts to adjust the positions of the cams axially of the shafts, a gear wheel loose on one shaft, a gear wheel fast on the same shaft, a frame rotatably mounted on the said shaft, a pinion rotatably mounted on the frame in gear with the said fast and loose gear wheels, means for holding the frame against rotation, and gearing rotationally connecting the loose gear wheel of said last-named shaft with the other shaft.

6. Gearing for transmitting synchronized movement, comprising multiple faced cams, hollow shafts on which the said cams are mounted, said shafts having slots, keys rigidly connected to the cams and slidable in the slots of said shafts, rods connected to the keys and movable within the shafts to adjust the positions of the cams axially of the shafts, a gear wheel loose on one shaft, a gear wheel fast on the same shaft, a frame rotatably mounted on the said shaft, a pinion rotatably mounted on the frame in gear with the said fast and loose gear wheels, and means for holding the frame against rotation and for adjusting the position in which it is thus held, and gearing rotationally connecting the loose gear wheel of said last-named shaft to the other shaft.

7. Gearing for transmitting synchronized rotary movement, comprising a driving shaft, a plurality of driven shafts, multiple faced cams mounted on said shafts, means for adjusting the position of each cam axially of its shaft, a gear wheel fast on the driving shaft, a gear wheel loose on each driven shaft and in gear with the gear wheel on the driving shaft, a gear wheel fast on each driven shaft, a frame rotatably mounted on each driven shaft, a pinion mounted on each frame in gear with the corresponding fast and loose gear wheels, and means for adjustably holding each frame against rotation.

CARL HENRY RANKIN.

Witnesses:
GEORGE HARRISON,
CHAS. F. MURPHY.